United States Patent

Aarre et al.

Patent Number: 5,551,794
Date of Patent: Sep. 3, 1996

[54] SWIVEL LINK

[76] Inventors: Arne Aarre, Askepottveien 37; Knut S. Oaland, Røyskattveien 27, both of 4300 Sandnes, Norway

[21] Appl. No.: 307,822
[22] PCT Filed: Mar. 29, 1993
[86] PCT No.: PCT/NO93/00050
§ 371 Date: Sep. 29, 1994
§ 102(e) Date: Sep. 29, 1994
[87] PCT Pub. No.: WO93/20360
PCT Pub. Date: Oct. 14, 1993

[30] Foreign Application Priority Data

Apr. 3, 1992 [NO] Norway ................ 921297

[51] Int. Cl.⁶ .................. F16C 11/04; F16B 3/06
[52] U.S. Cl. .............. 403/374; 403/371; 403/367; 403/78; 403/22
[58] Field of Search .............. 403/22, 78, 66, 403/52, 374, 370, 371, 367; 411/115, 948, 321, 322, 323

[56] References Cited

U.S. PATENT DOCUMENTS

| 389,480 | 9/1888 | Massett | 403/370 X |
| 1,561,507 | 11/1925 | Clark | 403/371 |
| 3,784,316 | 1/1974 | Bittern | 403/22 X |
| 4,824,281 | 4/1989 | Katsube | 403/370 X |

FOREIGN PATENT DOCUMENTS

| 55652 | 9/1952 | France |  |
| 821448 | 10/1951 | Germany |  |
| WO89/11598 | 11/1989 | WIPO | 403/370 |
| 90/15262 | 12/1990 | WIPO |  |

Primary Examiner—Anthony Knight
Attorney, Agent, or Firm—Andrus, Sceales, Starke & Sawall

[57] ABSTRACT

A swivel link, particularly for use for rotative interconnection of two relatively pivotable machine parts (1, 2) or similar mutually articulated members at their adjacent end portions. The swivel link comprises a bolt (4) and two expandable, internally conical sleeves (5', 5"). The bolt (4) is formed with two oppositely directed, conically tapering end portions (4', 4") each intended to be positioned in an attachment hole (3) of one of the parts and to cooperate with one of said internally conical sleeves (5', 5"). A nut (6, 7) engages each of said sleeves to axially displace the respective internally conical sleeve (5', 5") along the tapered end portions, in order to bring the latter into engagement respective attachment hole (3). The bolt (4) is formed with a through-going, central, axially directed bore (8) for rotatively accommodating a shaft (9) having threaded portions for the nuts (6, 7) carrying the conical sleeves. One of the nuts (7) and the adjacent bolt portion (4") are provided with mutually cooperating guide/retainer elements (15, 16) preventing rotation of the nut (7) with respect to the bolt (4). This enables the conical sleeve associated with the one nut to be tightened and loosened by rotation of the shaft with respect to the bolt.

6 Claims, 1 Drawing Sheet

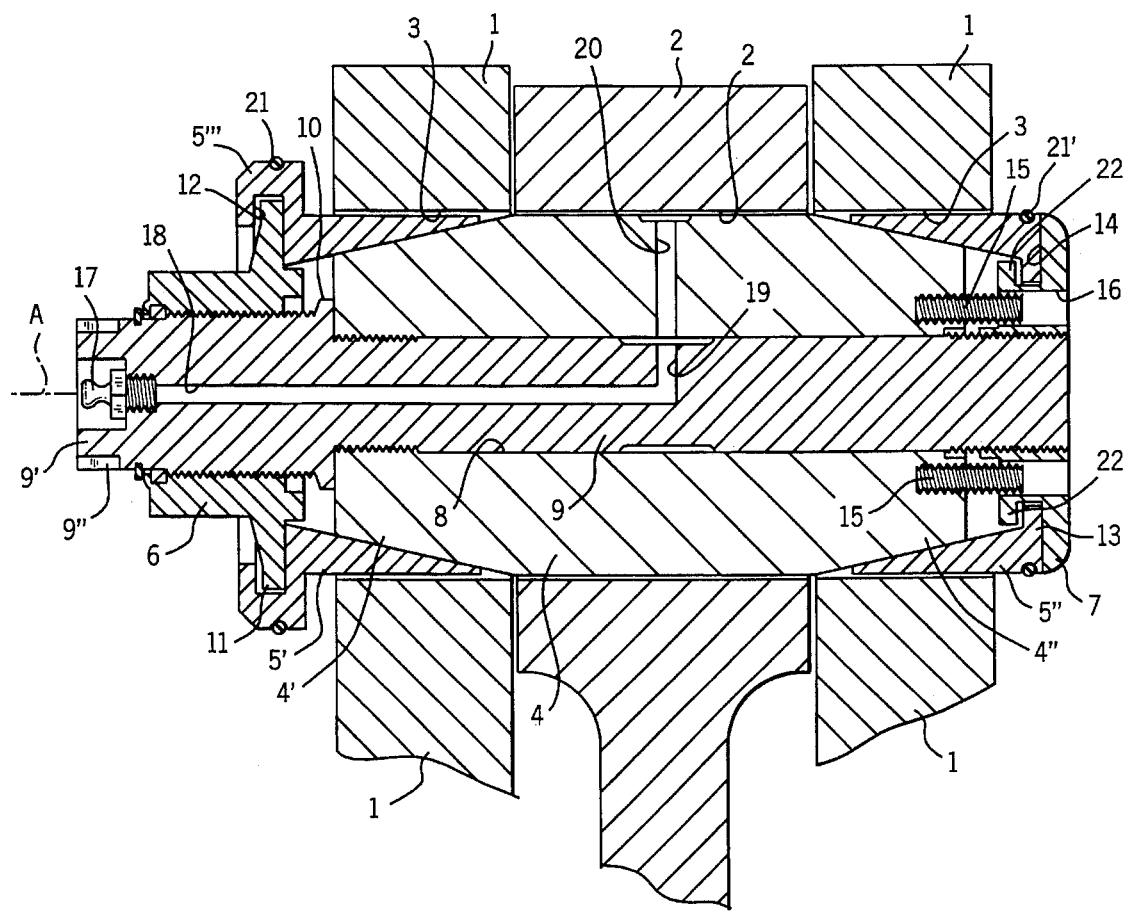

5,551,794

SWIVEL LINK

This invention relates to a swivel link, especially for use in rotative interconnection of two relatively pivotable machine/building/construction members or similar inter-hinged parts at their adjacent end portions. One of said members/parts may be bifurcated and formed with two aligned swivel link attachment holes. The swivel link comprises one bolt and two expandable, internally conical sleeves, wherein the bolt is formed with two opposite directed, conically tapering end portions each intended to be placed in an attachment hole and each to cooperate with an internally conical sleeve. Each sleeve is assigned a nut for axial displacement of the respective internally conical sleeve, in order to bring the sleeve into surrounding engagement with the associated conical bolt portion within the respective-attachment hole. The bolt is formed with a through-going, axially directed bore for the accommodation of a shaft having threaded end portions for said nuts, said shaft, at one end portion thereof, having a stop flange which may be brought to rest against the adjacent end face of the bolt.

Such a swivel link is used where space conditions do not allow tightening of one of the nuts by means of an appropriate tool, i.e. in cases where one cannot reach the nut outside one of the attachment holes.

Likewise, it is previously known that the through-going shaft has a key groove in the end having free access. Upon rotation of the shaft from the end to which one has free access, it is intended that the non-accessible nut shall be displaced axially without any rotation, in order to, during the axial displacement thereof, to push the associated internally conical sleeve, often designated the cone sleeve, onto the adjacent conical end portion of the bolt, whereby the cone sleeve is brought to expand radially while wedging itself into the space between the conical end portion of the bolt and the internal wall defining the respective attachment hole.

In order no allow this known swivel link to function according to the purpose thereof, it is, of course, a presupposition that the non-accessible nut does not rotate with the through-going shaft. Such an undesirable nut rotation is, however, very difficult, if not impossible, to avoid.

In practice, when this prior art swivel joint is to be mounted, it has been found that the non-accessible nut has not been tightened properly, because it has turned around as the through-going shaft was rotated from the available end thereof. In fact, nothing prevents the non-accessible nut from turning, and one achieves at the most a very unsatisfactory influence on the respective cone sleeve, which then does not become properly expanded within the attachment hole, slackness or play within the hole not being taken sufficiently up. The complete result of such an inexpedient mounting of a swivel link of this kind is an articulation wherein the bolt is loose at one attachment, which may involve damages to the equipment wherein such an articulation is incorporated.

The accessible nut is rotatable on the through-going shaft's opposite, threaded end portion and becomes tightened as usually, so that, at the accessible end of the swivel link, difficulties do not arise in expanding the cone sleeve properly within the space between the attachment hole wall and the conical bolt end portion.

Between the two conically tapering end portions, the bolt has a central, cylindrical bolt portion on which the pivotable machine/building/construction member is rotatively supported, usually through the intermediary of a bearing (articulated or swivel bearing, slide or plain bearing), arranged in a bore in said pivotable member's end portion which, in active position, is positioned between the two branches of the bifurcated end of the attachment part, said bore being coaxially aligned with the two attachment holes.

The through-going shaft has a central lubricating groove which, at the inner end thereof, passes into a radial groove. The outer end of the latter is to be brought into registry with a radial lubricating groove in the bolt, the bolt groove opening at the outer surface of the bolt in the area of the central portion of the bearing, which may have a corresponding lubricating groove.

It has been found extremely difficult to mount the swivel link such that the lubricating groove of the through-going shaft corresponds with the lubricating groove of the bolt, and such that the lubricating groove of the bolt corresponds with the lubricating groove of the sliding bearing. Swivel links of the kind concerned are often mounted by unskilled persons unaccustomed with fine tolerance of fit and measuring methods. The result may be that the lubricating channels are not brought into mutual registry, but become covered, such that grease supplied from the available end of the shaft does not reach the bearing. Then, rubbing and excessive wearing may damage the bolt and slide bearing. When the swivel link is to be replaced or when demounting the equipment wherein the swivel link is incorporated and forms the articulation, great problems may arise. Often, the swivel link can not be disassembled. When the through-going shaft has been screwed out, the bolt as well as both cone sleeves are stuck within the articulation. These can not be pulled out straight off. Therefore, the disassemblage requires the bolt or the attachment ears forming the attachments to be burned off. As this swivel link structure is one being the most useful with positioning in spaces having a small clearance between attachment and driver's cabin or other equipment, it is very difficult to arrive at the portion to be treated with tools and welding apparatus.

At best, such a solution causes a long stoppage and large repair costs.

In practice, it has moreover in many cases been found that the through-going shaft can not be pulled out because the inaccessible nut rotates together with the shaft during the unscrewing. Also, it has been difficult to use cone sleeves having too large dimensions in order to take up slackness within attachment holes as the result of a knocking or beating action as well as wear and tear after use for some time. This is due to the fact that known cone sleeves are formed in one piece as well as having an outside diameter corresponding to the inside diameter of the bore in the articulated or swivel bearing of the link.

The object of the present invention has primarily been to provide a swivel link of the kind defined introductorily, in which the inaccessible nut does not rotate together with the through-going shaft, such that the associated cone sleeve becomes pushed pressingly up on the adjacent conical bolt end portion for wedging the same within the attachment hole, as well as one in which disassembling of the swivel link is obtain without problems, and in which replacement of the cone sleeve with which the inaccessible nut cooperates with a new cone sleeve having a larger efficient outside diameter may be carried out when the attachment hole has increased in diameter.

In accordance with the invention, said objects are realized through designing the swivel link according to the features as set forth in the following claims.

According to the invention, the bolt is provided with axially directed guide/retainer means formed to cooperate with corresponding, complementary, axially directed guide/retainer means incorporated in one nut (the inaccessible nut in the position of use) of the swivel link, the cooperating, axially directed guide/retainer means having a relative axial movement possibility. The bolt's moment of inertia is very substantial in relation to the torque to which this (inaccessible) nut is subjected from the rotation of the through-going shaft, such that the bolt, through its guide/retainer means engaging the guide/retainer means of the nut, efficiently prevents rotation of the inaccessible nut when the shaft rotates. This secures appropriate tightening of the cone sleeve influenced by the inaccessible nut.

Upon disassemblage, in the device according to the invention, the through-going shaft may be unscrewed without giving the inaccessible nut an opportunity to rotate, which in a substantial degree facilitates the disassembling of the swivel link.

Another advantage with the invention is that the inaccessible cone sleeve after some time's use may be replaced by a new cone sleeve having a larger efficient diameter. This is necessary as the slackness within the attachment holes in course of time may have become substantial. To this end, the cone sleeve (except the outer flange) is divided into two segment halves which, during the assemblage are kept together by means of an elastic ring placed in a circumferential groove in the sleeve halves. The two halves of a cone sleeve made through sawing it into two attain a smaller inactive (assemblage) diameter than an undivided sleeve, because about 4 mm is removed from the sleeve circumference through the sawing. Prior to the expansion, such a divided cone sleeve may be guided through the bore of the spherical slide bearing, because the non-expanded inactive diameter thereof is slightly smaller than the bore diameter, and the elastic ring keeps the cone sleeve halves together in this inactive position during assembling. Nevertheless, this new cone sleeve is in a position to expand and take up slackness within the attachment hole. When the new cone sleeve is pulled up on the adjacent conical bolt portion, the cone sleeve expands to a larger efficient diameter than the original cone sleeve had. Thereby, one achieves extra accommodation of slackness within the attachment hole.

An example of a preferred embodiment is further explained in the following, reference being made to the drawing, in which the single FIGURE shows an axial section through a swivel link according to the invention in the attached functional position thereof.

The shown embodiment of the swivel link is particularly intended used for rotative interconnection of two relative pivotable machine/building/construction parts 1 and 2 at the adjacent end portions thereof.

One 1 of these parts 1, 2 is bifurcated and comprises, thus, two fork branches or attachment ears formed with aligned attachment holes 3 for the swivel link, the other part 2 comprising an articulated or swivel bearing (not shown) having a through-going bore 2' for the accommodation of the bolt 4 of the swivel link at the cylindrical central portion thereof. The bolt 4 has two opposite directed conically tapering end portions 4', 4".

Besides the bolt 4, the swivel link comprises two internally conical, expandable sleeves 5', 5", so-called cone sleeves, each formed to cooporate with the adjacent conical bolt portion 4', 4" when the latter is positioned within the associated attachment hole 3.

For the axially directed displacement thereof, each cone sleeve 5', 5" is assigned a nut 6 or 7 having mutually differing designs. The nuts 6, 7 serve to displace the cone sleeves 5', 5" into surrounding engagement with the associated conical bolt portion 4', 4", whereby they themselves are surrounded by the attachment hole wall face.

The swivel link 4 is formed with a central, axially through-going bore 8 for turnable accommodation of a shaft 9 having threaded end portions for said nuts 6 and 7, said through-going shaft 9 having a stop flange 10 which may be brought to rest supportingly against the opposing end or face of the bolt.

As known per se, each cone sleeve 5', 5" is rotatively, nonaxially displaceable connected to the associated nut 6 respectively 7.

To this end, a radially outwardly directed collar 11 on the nut 6 engages rotatively into an internal circumferential groove 12 in an outwardly directed flange 5'" of the cone sleeve 5', and an inwardly directed collar 13 on the cone sleeve 5" engages rotatively into an external circumferential groove 14 in the nut 7.

A swivel link having such a design is used where space conditions on the assembling place do not allow the use of tools for tightening the nut 7 which, therefore, must be tightened by means of the through-going shaft 9. For the same reason, the entire swivel link must be capable of being pushed through the bore 2' of the articulated bearing (not shown) of the part 2 and, consequently, the cone sleeve 5" can not have an outwardly directed flange corresponding to the flange 5'" of the cone sleeve 5'.

To this end, the end 9' of the through-going shaft 9 is formed with an axially directed groove 9" for a tool (spanner) with which the shaft 9 is rotated. When the flange 10 of the shaft 9 rests supportingly against the end face of the bolt 4, such as shown in the figure of the drawing, the shaft 9 will act as a motion screw for the nut, such that the nut 7 upon continued rotation of the shaft 9 will be pulled axially inwards in the direction of the articulated bearing of the part 2, provided that the nut 7 does not rotate. One has not been able to avoid such an undesired nut rotation in swivel links formed in accordance with prior art technique.

This undesired nut rotation which may have serious consequences for the attachment of the swivel link in the area of the nut 7 is, in accordance with the present invention, efficiently avoided through providing the bolt 4,4',4" with—according to the embodiment—two guide/retainer means, here shown in the form of two eccentrically positioned pins 15 engaging displaceably into complementary bores 16 in the nut 7. Even one eccentrically positioned pin 15 having an associated bore 16 will be in a position to prevent rotation of the nut 7 when the shaft 9 is turned. However, one prefers a more symmetrical positioning of said guide/retainer means around the axis A of the swivel link.

The guide/retainer pins 15 which may be screwed into the bolt 4,4',4", could instead been attached to the nut 7. Then, the bolt is formed with bores having a sufficient axial length to enable the necessary axial movement of the nut.

Thus, one or more cooperating guide/retainer means 15, 16 may be arranged on bolt and inaccessible nut 7, in order to prevent the nut 7 from following the rotation of the shaft 9 during the tightening of the nut 7 and the expansion of the associated cone sleeve 5" within the attachment hole 3 while it surrounds the associated conical bolt portion 4".

The guide/retainer device 15,16 serves a corresponding and very important purpose upon disassembling the swivel link for replacement or for replacing cone sleeve(s).

From a lubricating nipple 17 in the hollow end 9' of the shaft 9, a central, axially directed lubricating channel 18 leads into the middle of the shaft 9, where the lubricating channel passes into a radial lubricating channel 19 which, with a correctly mounted swivel link, registers with a radial lubricating channel 20 in the bolt 4, the last-mentioned lubricating channel 20 opening into a lubricating groove (not shown) in the articulated bearing (the swivel bearing). The device according to the invention secures that the radial channel 19 in the shaft 9 always registers with the channel 20 of the bolt and that the last-mentioned channel always registers with said bearing lubricating groove. This is due to the fact that the cone sleeve 5" through the intermediary of the nut 7 always is pulled appropriately up on the conical end portion 5''' of the bolt, such that the bolt 4 at all times arrives in a symmetrical position with respect to said central bearing lubricating groove.

As mentioned introductorily, the internally conical sleeve 5" or possibly both sleeves 5', 5" may be divided along axial plane(s), e.g. by sawing. In unexpanded condition, such a sleeve 5" attains a not quite circular external circumferential shape having a largest diameter which must be smaller than the diameter of the bore 2'. In expanded condition, the sleeve will exhibit a circular circumferential shape having a diameter exceeding the diameter of the bore 2'. Thus, such a sleeve is in a position to take up slackness within a undesirably widened attachment hole 3. The cone segments constituting the sleeves 5' and 5", are pulled together by means of O-rings 21 and 21'.

The (inaccessible) nut 7 may, at the axially inner end thereof in connection with the circumferential groove 14, be formed with a radially outwardly directed flange 22 resting against the radially inwardly directed flange 13 on the one sleeve 5". If one during disassembling the swivel link, subsequent to loosening the nuts 6 and 7, exerts a stroke on the shaft 9, the nut flange 22 will act as a carrier and take with it the cone sleeve 5" out of the attachment hole 3. Such a cone sleeve drawing-out can be accomplished even if the cone sleeve 5" has rusted in within the attachment hole. After the cone sleeve 5" has been loosened in this way, the elastic O-ring 21' will clamp the two cone sleeve halves (the cone sleeve segments) radially together, such that the cone sleeve 5" can be pulled out through the bore 2.

What is claimed is:

1. A link for pivotally connecting a first member to a second member, said second member having a portion embracing the first member, said embracing portion of said second member having link attachment holes aligned with a pivot hole in said first member, said link comprising:

a tubular member positionable in the aligned holes, said tubular member having a central axis extending between a pair of ends of said tubular member, said tubular member having a central cylindrical portion which is positioned in the pivot hole of said first member when said tubular member is inserted in said aligned holes so that said first member may rotate with respect to said tubular member, said tubular member having conically tapering end portions at each end thereof, the outer surface of each of said conically tapering end portions being inclined toward the central axis of the tubular member in a direction toward the respective end of said tubular member, one of said conically tapering end portions being positioned in each of said attachment holes of said second member portion when said tubular member is inserted in said aligned holes;

an expandable, internally conical wedge sleeve member mounted on each of said tapering end portions to surround said outer surface of said tapering end portion;

a shaft extending axially through said tubular member, said shaft being rotatable with respect to said tubular member and having exposed end portions extending from each end of said tubular member, at least said end portions of said shaft being threaded, said shaft having means abutting a first end of said tubular member for preventing axial movement of said shaft with respect to said tubular member toward a second end of said tubular member when said shaft is in a given position with respect to said tubular member;

a nut threaded on each of said exposed end portions of said shaft adjacent the ends of said tubular member, each of said nuts being axially moveable along said shaft responsive to relative rotation between the nuts and said shaft, each of said nuts engaging one of said wedge sleeve members for moving the wedge sleeve member along the inclined outer surface of one of said tapering end portions by the movement of the associated nut along said shaft, movement of said sleeve members up the inclined outer surface of said tapering end portions bringing said sleeve members into wedging engagement with the attachment holes of said second member portion to secure said link to said second member; and means interposed between said second end of said tubular member for engaging the adjacent nut for preventing rotation of said adjacent nut with respect to said tubular member while allowing axial displacement of said adjacent nut with respect to said tubular member, thereby to axially move the wedge sleeve member associated with said adjacent nut along the inclined surface of the tapering end portion of said tubular member located at said second end of said tubular member as a result of the rotation of said shaft.

2. The link as set forth in claim 1 wherein said engaging means comprises at least one pin displaced from the axis of said tubular member and extending between said one end of said tubular member and said adjacent nut.

3. The link as set forth in claim 2 wherein said pin is mounted in one of said one end of said tubular member and said adjacent nut and wherein the other of said adjacent nut and said one end of said tubular member has a bore for receiving said pin during axial displacement of said adjacent nut with respect to said tubular member.

4. A link as set forth in claim 1 wherein at least one of said internally conical wedge sleeve members contains at least one cut parallel to the axis of said tubular member, said cut permitting the circumferential dimension of said sleeve to be reduced during insertion of said link into said aligned holes and thereafter expanded by movement of said wedge sleeve member along the inclined outer surface of said tapering end portion.

5. A link as set forth in claim 4 wherein said at least one of said internally conical wedge sleeve members is cut at a plurality of circumferentially spaced locations about said sleeve member.

6. A link as set forth in claim 1 wherein said adjacent nut at said one end of said tubular member is further defined as engaging said one of said wedge sleeve members for moving said sleeve member with said nut in both directions of axial movement of said nut along said shaft.

* * * * *